United States Patent
Ost et al.

(10) Patent No.: US 9,334,150 B1
(45) Date of Patent: May 10, 2016

(54) SMART CONTAINER DISPENSER AND TRACKING SYSTEM

(71) Applicants: Stephen D. Ost, Scottsdale, AZ (US); Maher Pedersoli, Tucson, AZ (US)

(72) Inventors: Stephen D. Ost, Scottsdale, AZ (US); Maher Pedersoli, Tucson, AZ (US)

( * ) Notice: Subject to any disclaimer, the term of this patent is extended or adjusted under 35 U.S.C. 154(b) by 0 days.

(21) Appl. No.: 14/585,087

(22) Filed: Dec. 29, 2014

Related U.S. Application Data

(60) Provisional application No. 61/922,093, filed on Dec. 31, 2013.

(51) Int. Cl.
  *G06F 7/08* (2006.01)
  *B67D 1/12* (2006.01)
  *G06Q 10/08* (2012.01)
  *B67D 1/08* (2006.01)

(52) U.S. Cl.
  CPC ............ *B67D 1/1236* (2013.01); *B67D 1/0888* (2013.01); *G06Q 10/087* (2013.01)

(58) Field of Classification Search
  CPC ........... G06K 19/0723; G06K 7/10861; G07F 13/065
  USPC .......................................... 235/382, 492, 381
  See application file for complete search history.

(56) References Cited

U.S. PATENT DOCUMENTS

| | | | | |
|---|---|---|---|---|
| 6,572,016 B2* | 6/2003 | Saveliev et al. | ............... | 235/383 |
| 8,759,721 B1* | 6/2014 | Alexander | ..................... | 219/432 |
| 8,776,838 B1* | 7/2014 | Dorney | ............................. | 141/9 |
| 8,910,674 B2* | 12/2014 | Segiet et al. | .................. | 141/198 |
| 2011/0168775 A1* | 7/2011 | Van Zetten | .................... | 235/381 |

* cited by examiner

*Primary Examiner* — Seung Lee

(57) ABSTRACT

Beverage containers with attached or connected RFID tag. The RFID tag exciter is placed in or near the beverage dispenser for energizing the RFID tag and for discerning information therefrom. The information stored in the beverage containers is used to track it, record the consumable beverage types with which the containers are filled, the number of times the containers are filled, and the records of the types of beverages with which the containers are filled. The combination of different RFID tags is read and translated to identify a particular beverage container. The identity of the beverage container is entered into a smart mobile device application to track, record, and create customized drink selections associated with the identity of the beverage container. The records of the customized beverages are sent to the user's smart mobile device from a computer system connected via wired or wireless communication with the beverage dispensing system.

15 Claims, 14 Drawing Sheets

SMART CONTAINER DISPENSER AND TRACKING SYSTEM

CROSS REFERENCE

This application claims priority to U.S. Patent Application No. 61/922,093, filed Dec. 31, 2013, the specification(s) of which is/are incorporated herein in their entirety by reference.

FIELD OF THE INVENTION

The present invention relates to automatic beverage dispensing systems used in food service establishments and vending machines.

BACKGROUND OF THE INVENTION

Automated beverage dispensers have been developed for conserving beverages and increasing the productivity of the operator. One such automated beverage dispensing apparatus incorporates a graphical user interface to aid the consumer in selecting and customizing their beverage to be dispensed. The beverage dispensing machine records that customization for inventory management and quality assurance. The consumer has no means of tracking information pertaining to a beverage that is dispensed into a container or access that information at a later time. This trackable information is not given to the consumer to pre-select drink customizations using a smart mobile device application which would then relay that information back to the beverage dispensing system.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

This invention includes beverage containers with an attached or connected RFID tag. In one embodiment, relatively inexpensive passive RFID tags are used and are embedded or otherwise attached to the beverage containers. The RFID tag exciter is placed in or near the beverage dispenser for energizing the RFID tag on the food or beverage container, and for discerning information therefrom. Alternatively, an active RFID tag is used with a non-exciter reader. The information stored in the beverage containers can be used to track it, record the consumable beverage types with which the containers are filled, the number of times the containers are filled, and the records of the types of beverages with which the containers are filled. The combination of different RFID tags can be read and translated to identify a particular beverage container. The identity of the beverage container can be entered into smart mobile device application to track, record, and create customized drink selections associated with the identity of the container. The record of customized beverages are fetched to the user's smart mobile device from a computer system connected via wired or wireless communication with the beverage dispensing system. Depending on the detection or absence of detection of an RFID tag, the beverage dispensing systems may display information or allow a beverage to be dispensed. The invention also provides a system and a method for reading a particular container and associating that container's identity with a smart mobile device user using a smart mobile device application.

In one aspect of the invention, the containers are constructed to hold a consumable material, such as a cold or hot beverage. The container further includes a RFID tag attached or connected to the body. The RFID tag is constructed to receive a radio frequency (RF) excitation signal and, in response, emit an RF response signal. Alternatively, the RFID tag can have its own power source and transmit the RF response signal on a continuous or periodic basis. The body of the container can include, for example, a paper-based food receptacle, a paper-based beverage receptacle, a plastic-based receptacle or cup, such as a polystyrene or Styrofoam cup, or other containers comprising glass, ceramic or metal. The body has an outside surface and an inside surface, wherein the inside surface is adapted to contact the consumable material, e.g., food or beverage, and the RFID tag is attached or connected, for example, to the outside surface of the body. Alternatively, the RFID tag can be embedded within the material.

The RFID tag signal can relate to a type of consumable material, for example, a cold or hot beverage, to be included or dispensed into the body. The RFID tag response signal can also contain information relating to a plurality of inventory data, for example, the vendor ID liquid category or cup size, to be placed or sequentially encoded into the RFID tag. The RFID tag signal can further relate to a quantity or amount of consumable material, for example, a cold or hot beverage, to be placed or automatically placed into the body. The RFID tag signal can relate to the type and/or amount of consumable material to be dispensed or delivered and/or the sequence in which a plurality of such materials are to be dispensed or delivered.

In accordance with another aspect of the invention, a dispensing apparatus for filling a container includes a transponder exciter, a signal receiver, and a dispenser. The transponder exciter is constructed to generate and transmit an RFID tag excitation signal that is adapted to energize the transponder. The signal receiver is constructed to receive an RF transponder signal from the RFID tag, which is connected, attached or coupled to a container. The dispenser is operatively coupled to the signal receiver, and is constructed to dispense a predetermined amount or quantity and quality of a consumable beverage.

For example, at least one cold or hot beverage will dispense in response to the reception of the RFID tag signal by the signal receiver. The signal receiver is constructed to receive RFID tag signals similar in nature and content to the RF transponder signals discussed above. The dispensing apparatus can further include an alignment device constructed to accommodate and align a container relative to the dispensing apparatus. The dispenser apparatus can maintain a record of each container in which consumable beverages are dispensed. The system can be programmed to limit the number of dispensations that occur. The maintained record can then be shared with a remote computer system. The remote computer system can later share the data with a mobile application installed on a smart mobile device. The smart mobile device owner can retrieve the data by manually entering the container identification or by scanning a Quick Response (QR) code printed on the container using a mobile device QR code scanner. The user can associate the container identification data with a smart mobile user's account data. The user can also review, delete, or create new records of consumable beverage selections. The newly created records can be communicated to the remote server and later retrieved by the dispensing machine. The smart mobile application user can share the data with many other users in the form of recommendations or using social media networks.

DESCRIPTION OF PREFERRED EMBODIMENTS

Figure 1:
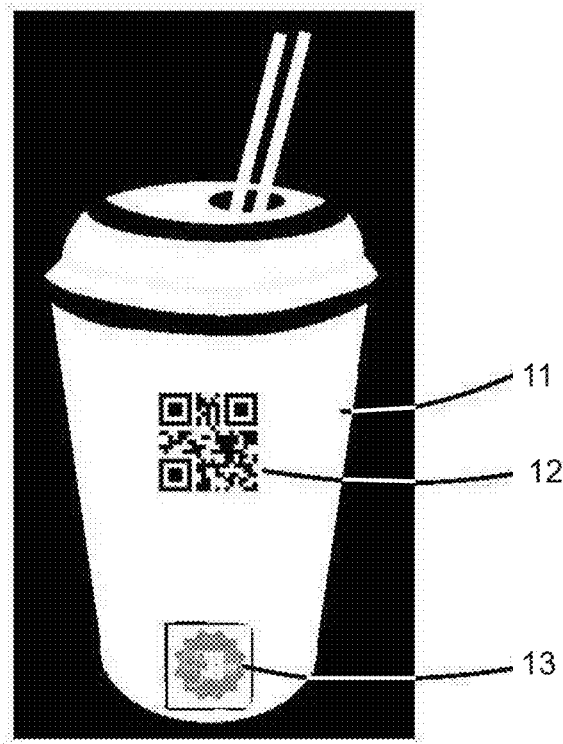
FIG. 1 is a beverage container equipped with an RFID tag and a printed QR code.
Figure 2:
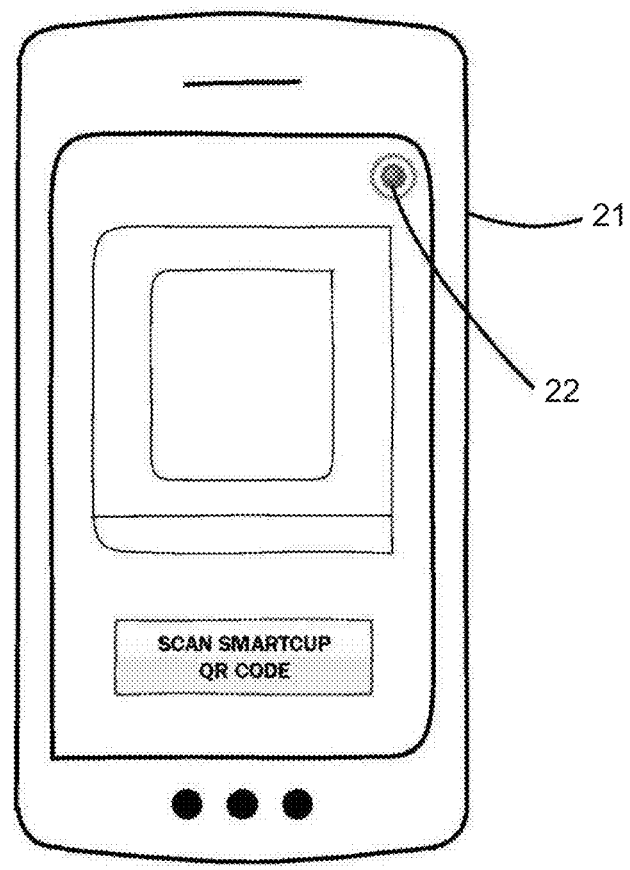
FIG. 2 is smart mobile phone with QR code scanner software capability.

Embodiments of the invention are described below, with reference to the figures. Throughout the figures, like reference numbers indicate the same or similar components.

Referring now to FIG. 1-14, an embodiment of the present invention is a smart beverage dispensing system. The system comprises a plurality of containers (104), a beverage dispensing apparatus (140), and an inventory manager (101). The containers are "smart" cups (11); shown in FIG. 1, each having a radio frequency identification (RFID) tag (13) and a Quick Response (QR) code (12), the RFID tag (13) and QR code are configured to encode a unique pre-set ID, which identifies the cup. The beverage dispensing apparatus is equipped with an RFID reader, which allows it to identify the container's unique ID and determines if the container is authorized to be dispensed into. The beverage dispensing apparatus is capable of dispensing at least one liquid, and selectively controlling which liquids may be dispensed. The inventory manager is operatively connected to the beverage dispensing apparatus, configured to store a plurality of unique pre-set IDs corresponding to the containers (11), along with information relating to which beverages and sizes the containers are permitted to purchase. The inventory manager may also track supplies of beverages and notify a user when beverage supplies are low. When a customer holding a container (11) approaches the dispensing apparatus (122), the beverage dispensing apparatus activates a sensor that reads the RFID tag (123) on the container (11). The beverage dispensing apparatus sends the RFID tag data to the inventory manager (124), whereupon the inventory manager decodes the RFID data to extract the unique pre-set ID of the container. The inventory manager compares the pre-set ID to the plurality of pre-set IDs stored in memory, whereupon if there is a match for the pre-set ID (125), the inventory manager directs the beverage dispensing apparatus to dispense a beverage (1213).

In one embodiment of the present invention, the beverage dispensing apparatus dispenses water in addition to at least one beverage. If the pre-set ID is not found, the beverage dispensing apparatus will allow water to be dispensed (126), but not other beverages. This system prevents theft of beverages from the dispenser by denying access to unauthorized containers. In one embodiment, the containers are disposable soda cups, with a low-cost RFID chip embedded in the cup.

In varying embodiments, the RFID (13) tag is adapted to encode information (54) including the vendor code, the beverage category code, the size of the container, the number of uses of the container, and the unique pre-set ID of the container.

In one embodiment, the RFID tag encodes information about the size of the beverage container. The inventory manager obtains the size of the container (11) from the RFID tag data (54), and the beverage dispensing apparatus is controlled to dispense a precise amount of liquid corresponding to the size of the container (11).

In one possible embodiment, the beverage dispensing apparatus (140) comprises:
 a. a dispenser housing (146), wherein the size and shape of the housing is configured to accommodate the size and shape of the container,
 b. a host controller board (141),
 c. a display screen (142), operatively connected to the host controller board,
 d. a dispenser head (145), disposed above the dispenser housing (146),
 e. a dispenser head electronics (143), operatively connected to the host controller board (141), capable of operating at least one valve (144) to dispense a precise amount of liquid from a storage container (147),
 f. at least one valve (144) for dispensing liquids, operatively connected to the dispenser head electronics (143), the storage container (147), and to the dispenser head (145),
 g. at least one storage container (147) for storing a liquid to be dispensed, where each container is operatively connected to one valve (144), wherein when the value is opened, the liquid flows from the storage container through the valve, to the dispenser head,
 h. an input/output board (148), operatively connected to the host controller board (141),
 i. an input device (149), operatively connected to the input/output board,
 j. a container detection mechanism (1410), operatively connected to the input/output board (148),
 k. a radio frequency identification reader board (1411), operatively connected to the input/output board (148),
 l. a radio frequency identification exciter antenna (1412), operatively connected to the RFID reader board (1411), and
 m. a communications adapter (1413), operatively connected to the host controller board (141), and to the inventory manager (82).

When customer places the container (11) in the dispenser housing (146), the container detection mechanism (1410) is activated. The signal is received by the input/output board (148), which sends a signal to the host controller board (141), whereupon the host controller board directs the RFID reader board (1411) to excite the RFID antenna/exciter (1412). The RFID antenna excites the RFID tag (13) in the container (11), and receives a signal from the RFID tag (13) in the container in response. The RFID signal is decoded by the RFID reader board (1411), and the RFID data is communicated to the host controller board (141). The host controller board sends the RFID data to the inventory manager (82) via the communications adapter (1413). The inventory manager checks the tags and verifies that it is valid (82), and sends an authorization to the host controller board (141). The host controller (141) displays a list of options on the display screen (142), and the customer selects a liquid using the input device (149). The selection is routed to the input/output board (148) and to the host controller board (141), whereupon the host controller board controls the dispenser head electronics (143) to activate an appropriate valve (144) to dispense a precise amount of the selected liquid. When the valve is opened, the liquid flows from the storage container (147) to the dispenser head (145) and is dispensed into the container (11). If the container detection mechanism (1410) is deactivated, the host controller board (141) directs the dispenser head to close the valve (144), whereupon the dispenser head (145) stops pouring.

In one varying embodiment, the RFID tag data contains a size limit for the beverage to be dispensed, and the inventory manager directs the host controller to dispense a specified amount of liquid corresponding to the beverage size. If the allotted size of the beverage has been reached the host controller directed the dispenser head electronics to close the valve.

In various embodiments, the communications card may be an Ethernet card, Wi-Fi receiver, Bluetooth receiver, Firewire adapter, or other means for communicating between computer systems as is known in the art.

In varying embodiments, the container detection mechanism is a proximity sensor, lever actuator, or button.

In varying embodiments, the input device may be a keypad, a set of buttons aligned with items on the display screen, a touch screen, or other means of input as is known in the art.

In one possible embodiment, the dispensing apparatus may comprise an alignment device constructed to accommodate and align a container (11) relative to the liquid dispensing apparatus (85) dispenser head.

In one embodiment, the beverage dispensing apparatus (85) comprises the ability to create a customized beverage. In this embodiment, several different beverages or flavorings are connected to various valves which may be controlled by the dispenser head electronics. In general the valves will all connect to the same dispenser head, although a possible embodiment may involve moving the cup from one dispenser head to another. In this embodiment, the host controller board is equipped to display a menu system for customizing a drink (1211) on the display screen. The customer selects options from the menu system using the input device (1212), and the host controller uses a state machine to keep track of which part of the menu the customer is in, to determine which option the customer selected when an input is entered. When the customer selects a final option, the host controller board computes precise amounts of a plurality of liquids to be dispensed for each customized drink. A precise amount of liquid is dispensed by opening a valve corresponding to that liquid for a precise length of time. The host controller board then controls the dispenser head electronics to create the customized drink by dispensing precise amounts of selected liquids into the container (1213), wherein the inventory manager stores the customized options and associates them with the pre-set ID of the container (1216). An example of this embodiment may be a customizable espresso drink machine, where the customer has the option of adding flavorings such as vanilla and caramel, or specifying the type of milk to be used to prepare the drink.

In one embodiment, the system further comprises a network of servers that store and share information about the number of uses of each container, along with customized drink options for each container. In this embodiment, each beverage dispensing system is operatively connected to a local soda machine server (95). The soda machine server is configured to store data corresponding to the containers (11), including the size of the container, pre-set ID, vendor code, liquid type. The soda machine server also stores a list of customized drink selections associated with each container. An application server (96) is networked with the soda machine servers (95) at various establishments, and container information and customized drink lists are shared between the soda machine servers and the application server. When the customer fills the container with a beverage at one location, this information is stored and uploaded to the application server to track how many times the container has been used. In this way, the system can limit the container to a previously purchased number of uses or total amount of beverage.

In one embodiment, when the customer creates a customized drink on the liquid dispensing apparatus (85), the soda machine server stores the customized drink options (1215), and associates the customized drink with the RFID data of the container (1216). The soda machine server (95) shares the customized drink and unique pre-set ID with the application server (96). When the customer approaches a second beverage dispensing apparatus (85) at a second location with the container (11), the inventory manager of the second beverage dispensing apparatus communicates the pre-set ID of the container (11) to the soda machine server (95). The soda machine server communicates the pre-set ID to the application server (96). The application server determines whether the cup is new or reused (128), whereupon if the cup is reused, the application server retrieves any customized beverage options stored on the application server (129). The customized drink options are communicated back to the second soda machine server and inventory manager (82), whereupon the customized drink options are displayed on the display screen as options within the menu system (129). The customer may select any previously created customized drink (1210) or create a new drink (1212), whereupon the host controller board receives the customized drink options from the inventory manager (92), whereupon host controller board controls the dispenser head electronics to create the customized drink by dispensing precise amounts of selected liquids into the container (1213).

Figure 3:
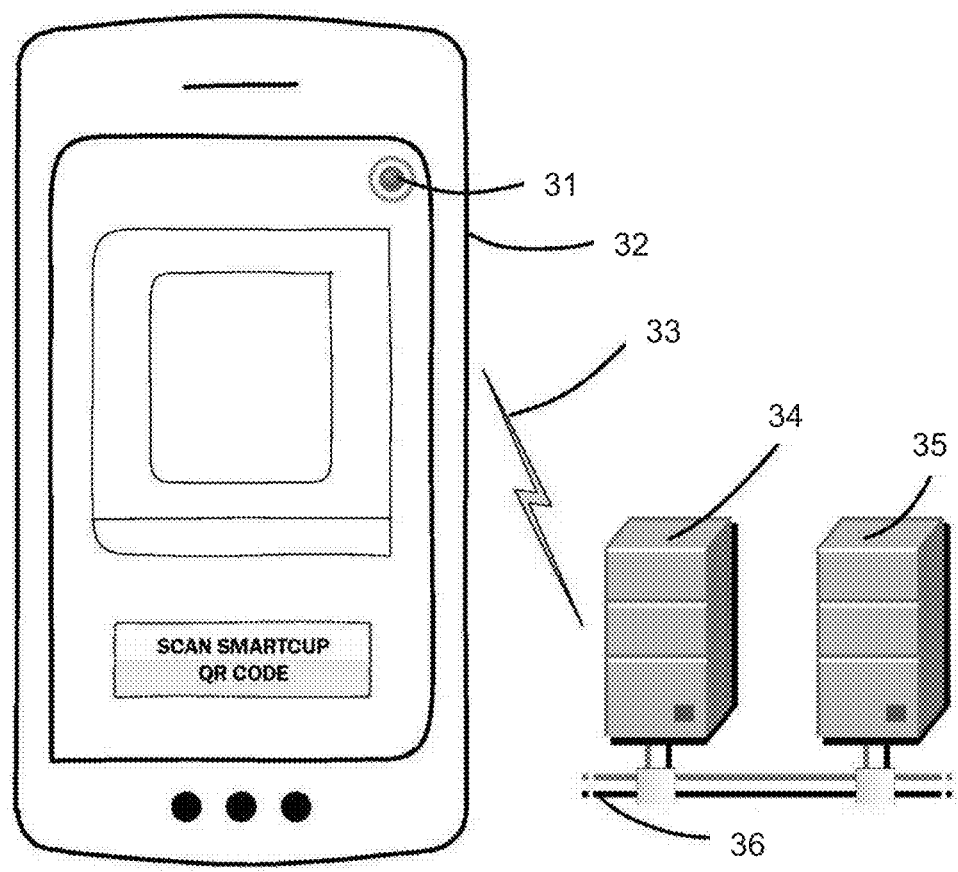
FIG. 3 is smart mobile phone connected via wireless signal to a network of servers.

As shown in FIG. 3, in one embodiment, a mobile device (32), equipped with a camera (31), may communicate wirelessly (33), with the soda machine server (34), and application server (35). The soda machine server and application server may be networked together on an Ethernet or other network (36).

Figure 4:
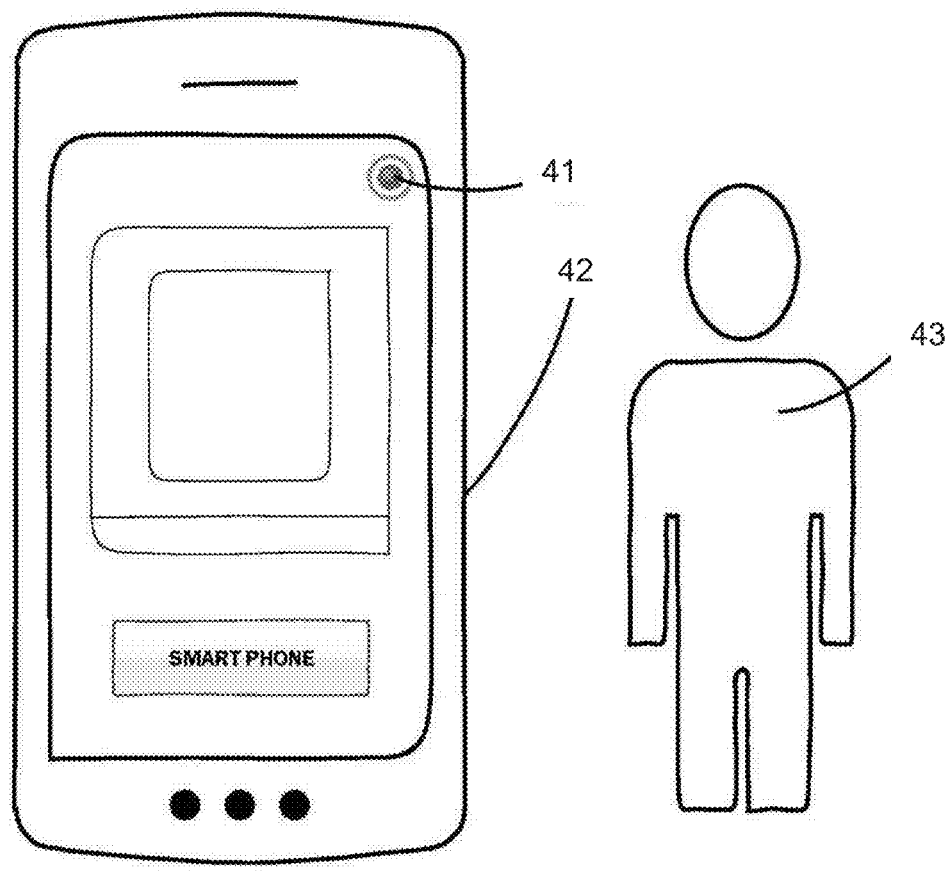
FIG. 4 is smart mobile phone with a smart phone user.

As shown in FIG. 4, in one embodiment, a customer (43) may interact with a mobile device (42), where the mobile device is equipped with a camera (41).

Figure 6:
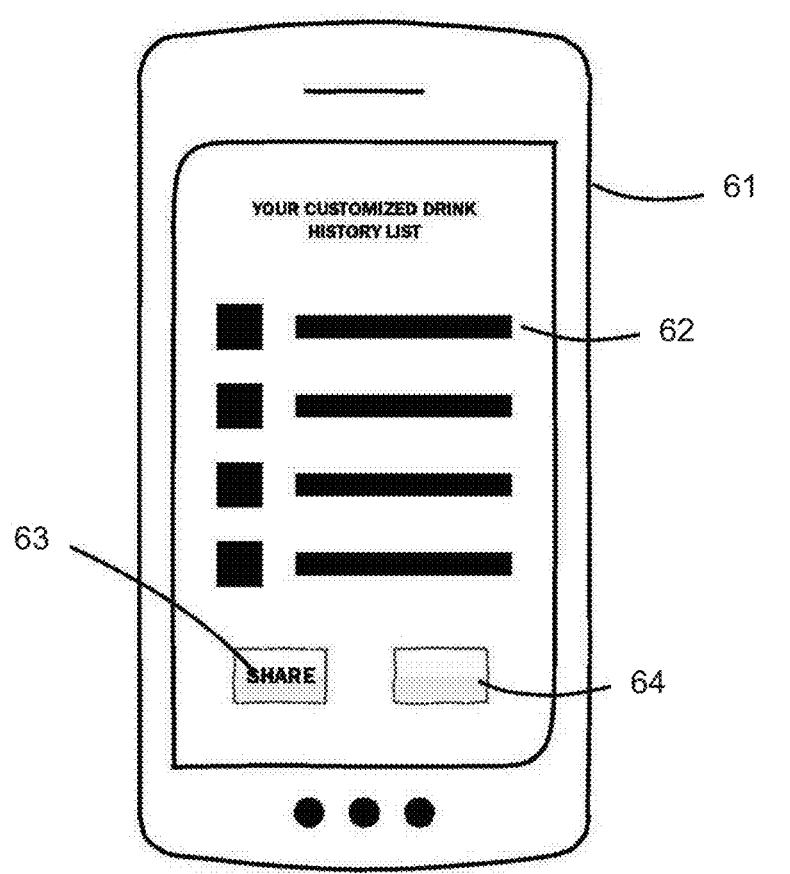
FIG. 6 is smart mobile phone with an entry form to share a customized beverage selection.

In one embodiment, the system comprises a mobile device application, running on a mobile device used by the customer, the mobile device application comprises:
  a. code for displaying an entry screen with a prompt button to scan a QR code (shown in FIG. 2),
  b. code for scanning a QR code, using a camera (31) operatively connected to the mobile device (32),
  c. code for displaying a manual entry form for a container code, d. code for receiving a QR code via manual entry by the user,
e. code for extracting data from the QR code related to the container, including a unique vendor code, liquid category code, container size, and unique pre-set ID,
f. code for storing and retrieving the container QR code in memory,
g. code for transmitting a container's QR code to the application server via a wireless interface,
h. code for receiving a list of customized beverage options from the application server,
i. code for displaying a list of customized beverages (62), on the mobile device (61), as shown in FIG. 6, along with a sharing button (63) for one or more social media applications (64),
j. code for sharing one or more customized beverages using a social media application interface, In this embodiment, a customer using the mobile application (132) scans the QR code disposed upon the container (133), whereupon the mobile application extracts the unique pre-set ID of the container from the QR code (12). Alternatively, the mobile device allows the user an option to manually enter a code, using built-in APIs for keyboard entry and the like. The mobile application sends the pre-set ID to an application server and the soda machine server (134), whereupon the application server and soda machine server determine if the pre-set ID is found (135). If the ID is not found, the ID is rejected (136), and the application returns (137). If the ID is found, the application server and soda machine server search for customized drink selections associated with the ID (138). If the app server and soda machine server find any customized drink selections associated with the pre-set ID, the application server (96) and soda machine server (95) return the list of customized drinks to the mobile application (1310). The list of customized drinks is displayed to the customer (1311) on the mobile device; whereupon the customer may share the customized drinks on a social media application (1312) using a social media application interface (API) as is known in the art.

Figure 5:
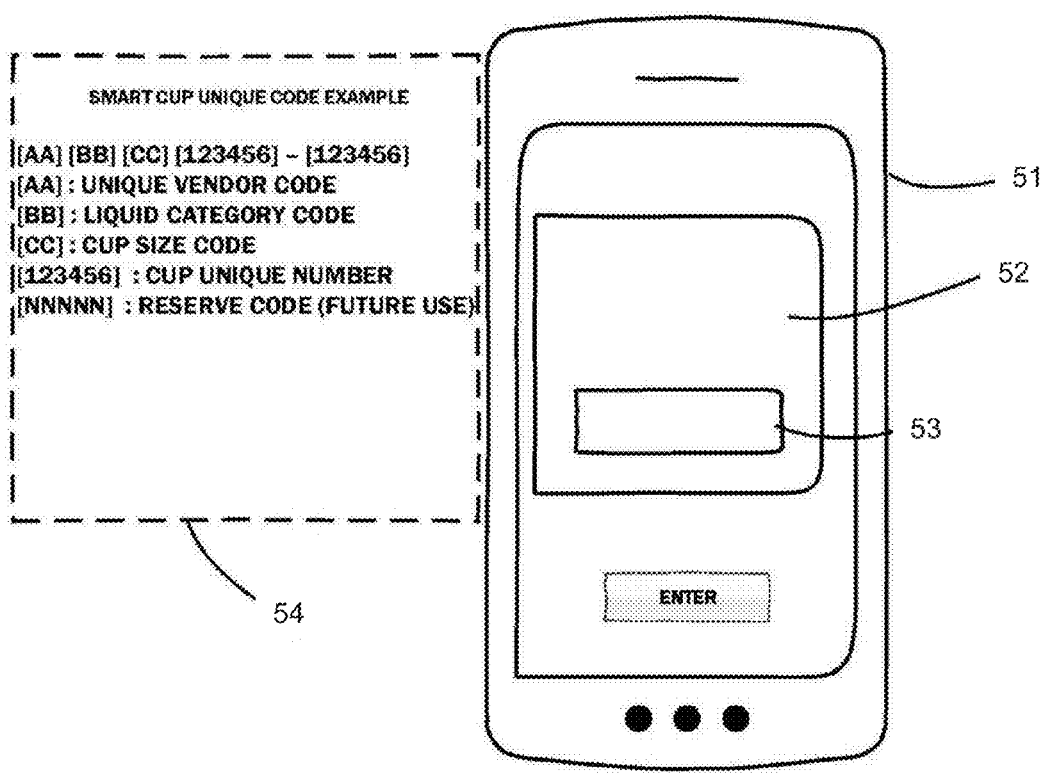
FIG. 5 is smart mobile phone with an entry form to enter the Smart Beverage Cup code.

As shown in FIG. 5, in one embodiment, a customer may enter a smartcup code manually into a manual entry box (53), on a manual entry form (52) displayed on the mobile device (51). The smartcup code may comprise information (54) such as the vendor code, liquid category code, cup size code, cup unique number, and reserved code. The reserved code may be modified to add future uses.

Figure 7:
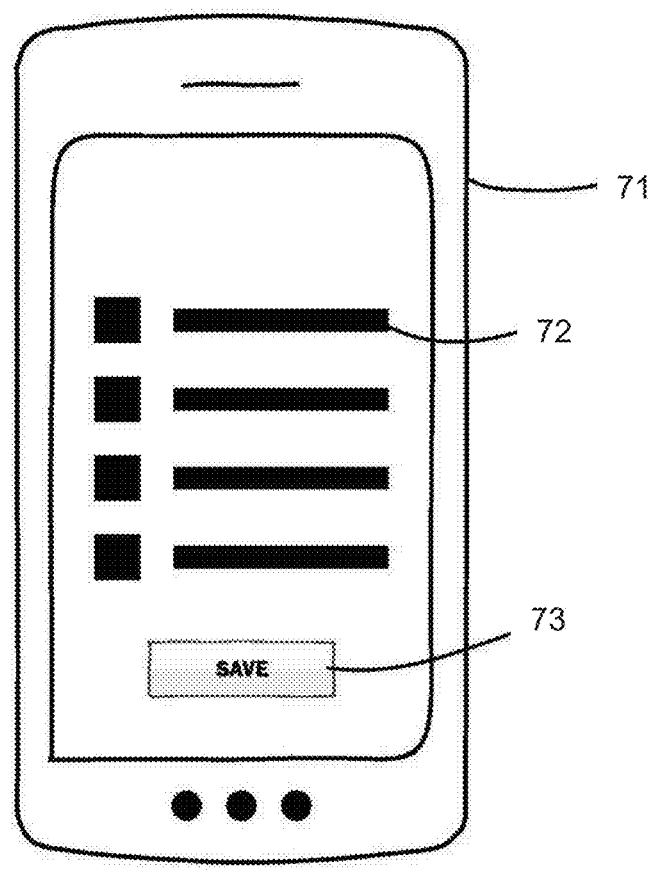
FIG. 7 is smart mobile phone with an entry form to create a customized beverage selection.

In one embodiment, shown in FIG. 7, the mobile device (71) application comprises code to add, edit, or delete customized beverage options. The application comprises code to display a form (72) including drop down menus or other user interface (UI) features, which allows the user to enter or modify ingredients in a customized drink. The form includes a save button (73). When the save button is pressed the modified data is uploaded to the application server (96), whereupon the modified customizations are retrieved from the application server and made available on the display screen (82) the next time the customer approaches a beverage dispensing apparatus with the container (11).

In an alternative embodiment, the mobile device application may be used to authorize drink purchases by the customer if the customer has forgotten or lost the container. In this case, if the customer has the QR code of the cup saved in his mobile application, the customer may use an alternative container. In this embodiment, the customer may select an establishment on the mobile device application, whereupon the mobile device communicates with the local establishment's soda machine server (95) via the application server, and provides the unique pre-set ID corresponding to the container. From this point, the process flow proceeds as before. If the container ID is authorized, a beverage is dispensed and the information on the number of uses of the container is updated in the application server (96).

Figure 8:
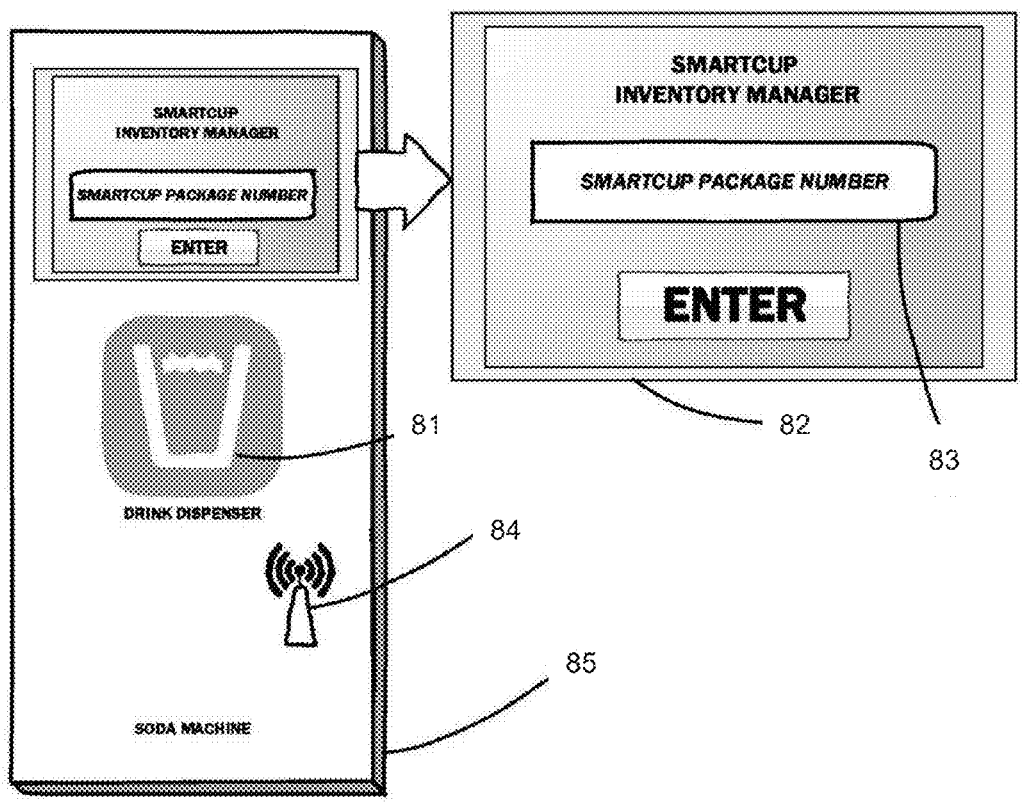
FIG. 8 is a beverage dispensing system equipped with graphical user interface and RF reader.

FIG. 8 is an illustration of a beverage dispensing apparatus (85) according to one embodiment of the invention. Beverage dispensing apparatus (85) includes a dispenser housing (81) having a top surface, side panels, front face and back surface (not shown). Also the beverage dispensing apparatus has a drip tray, valves, display screen (82), and lever actuators (not shown). Valves are controlled by corresponding dispensing head electronics (not shown). It should be understood that the basic components of the beverage dispensing system are not limited by this description. For example, the display screen (82) may be positioned above the housing (81) rather than within the front face of the housing (81). Actuators may be levers (not shown), buttons, or any other type of actuator known in the art. The dispensing of the beverage may alternatively be activated by sensing a cup below one of the valves or within the housing (81). Further, the shape and size of the housing (81) may vary according to the needs of the establishment where the beverage dispensing apparatus (85) is located.

With reference to FIG. 8, the beverage dispensing apparatus may be a dispenser for coffee or other hot beverages. The remaining description, unless otherwise indicated, will be presented with reference to cold beverage dispensing apparatuses (85); however, it should be realized that all of the disclosed features of the embodiments of the invention are equally applicable to hot beverage dispensing apparatuses (85). It should also be recognized that the following disclosure is not limited to cold and hot beverage dispensers and is equally applicable to frozen beverage dispensers, Frozen Carbonated Beverage Machines or any other type of beverage dispensers.

Figure 14:
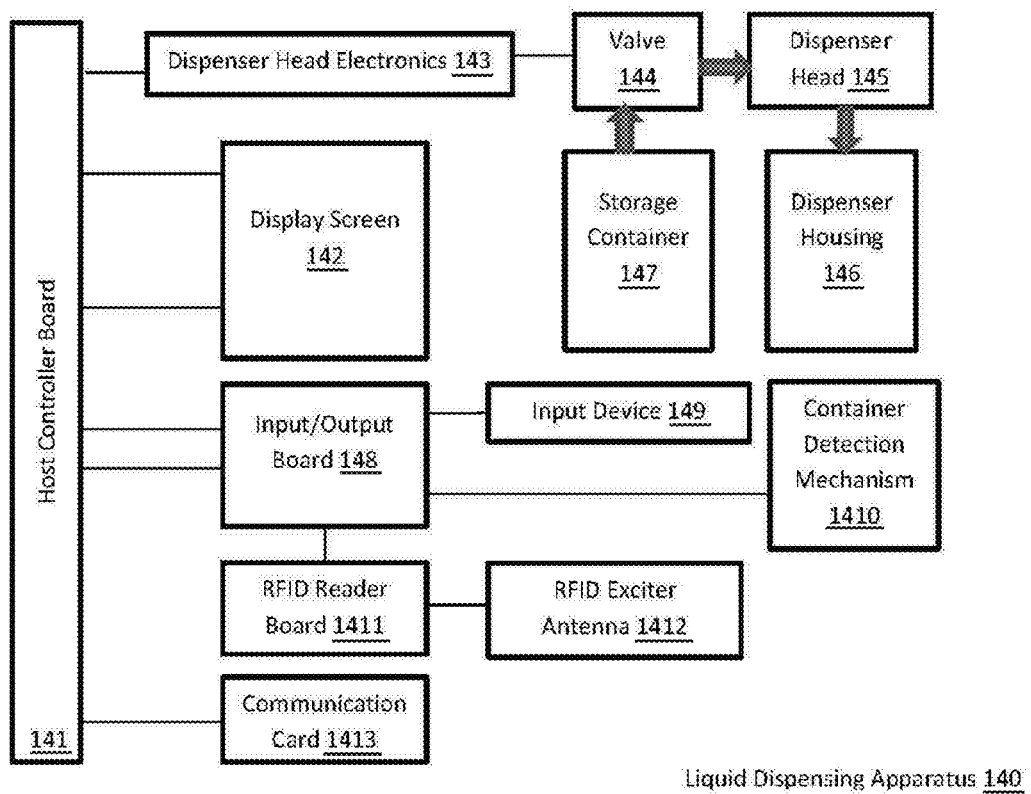
FIG. 14 shows a schematic diagram of a possible embodiment of the beverage dispensing apparatus.

With respect to FIG. 14, in one embodiment the I/O board (148) may include an on/off switch, a power providing transformer, a rectifier and one or more regulators (not shown). Also included is a RFID reader board (1411) and communication devices (1413), which may be an optical radio modem, inputting information to the I/O board (not shown). The host controller board (141) may include a clock, which may be a real-time clock. The host controller board (141) may also include a flash, an I/O, a SRAM, a CPU and timers. The host controller board (141) provides the overall operation and data storage of the dispensing apparatus (140). The information can be sent via cellular Ethernet (internet), manual collection at the system, or a portable USB port memory storage device. The information can then be downloaded into a main computer for predetermined calculations, as will be discussed in detail below.

The beverage dispensing apparatus (85) of FIG. 8 is adapted to communicate with an RFID tag (13). As shown in FIG. 1, the RFID tag (13) may be attached to a container or a cup (11). A cup (11) may have a generally cylindrical configuration with an inner wall and an outer wall defining an intermediate air space there between. Further, a cup (11) may include an upper lip, a bottom, and/or a handle. The RFID tag (13) may also be attached to any other type of container, such as a glass container, a paper container, a bottle, or an ice bucket for ice. The RFID tag (13) may be attached to the outer surface of a cup (11) by, e.g., an adhesive, fasteners or inlay molded into the plastic when the cup is manufactured. Those skilled in the art recognize that there are various techniques for coupling a RFID tag (13) to a cup (11). For example, although not illustrated, a RFID tag (13) can be attached to the inner surface of a cup (13). Of course, a protective layer or housing can prevent contact between the RFID tag (13) and the liquid held within the cup (11). In one embodiment, the RFID tag (13) can be embedded within the cup (11). For example, the RFID tag (13) can be embedded between the inner wall and the outer wall. The cup (11) may be formed by molding around the RFID tag (13). The molding process can be a one step or a multi-step process. For example, a first portion of the cup (11) can be molded and then the RFID tag (13) can be attached to the first portion. An overlay or second portion can then be formed over both the first portion and the RFID tag (13). Of course, the RFID tag (13) can have various shapes and sizes. The RFID tag (13) may have a thickness t1 less than then the thickness of t2 of the walls of cup (11). Those skilled in the art recognize that various techniques can be employed for embedding the RF receiver in the cup (11). The cup (11) can also be a disposable cup.

As shown in 54 of FIG. 5 the RFID tag (13) is adapted to store the inventory information relating to at least one of the following: the vendor code, the beverage category code, the size of the cup, and the unique cup code such as a serial number as shown in (54). An ISO 15693 certified read/write 13.56 MHz RFID tag has the ability to read through water, human tissue and plastic. These ISO certified tags are individually numbered giving the system the ability to individually track each cup in the system and encode it within the QR code data shown in (12) of FIG. 1. The tags also have anti-collision identification protocols within the ISO 15693 readers allowing multiple transponder or tags to be read simultaneously. In some embodiments, the RFID tags will be passive tags, so the RFID tags will not have a battery source, giving the tag a very long shelf-life. Passive RFID tags may be powered up by the RFID antenna to read and write information to the tags. In one embodiment, the RFID tag (13) is powered up by a first RFID antenna at a cash register and by a second RFID antenna at the dispensing system. Active tags, which use a battery source, may also be used in applications creating a larger read/write field and read by a mobile device such a smart mobile device equipped with such reader.

The RFID tag (13) as described in FIG. 1 includes a number of bits of storage. However, it should be understood that beverage dispensing apparatus (85) may be used with either a high frequency (HF) or ultra-high frequency (UHF) antenna/reader. HF antennas/readers are less expensive, have smaller read fields and use more costly tags. UHF antennas/readers are more expensive, have larger read fields, and use lower cost tags. The RFID tags may store information including and not limited to what is shown in (54) FIG. 5. Each tag may have a unique ID encoded in the QR code print (12). For example, in one day, each location can receive an approximately 520,000 unique IDs available in a single package. This package is marked with a number to indicate the quantity and the range of IDs for each individual cup as shown (83) to be entered in the inventory manager of the dispensing system as shown in (82) of FIG. 8. The RFID tags may be manufactured with a pre-set unique Tag ID. In one embodiment, the inventory manager program (82) will keep a number of digits of the unique package pre-set ID. The probability that different cups in the package will be assigned the same ID is minimized. However, if two cups happen to be assigned the same ID, other differences may be used to distinguish the tags (for example "Ship Date", "No. of Units within the Package", etc.) and create a unique combination.

In alternate embodiments, the RFID tag (13) may be a read only tag, a WORM (write once, read many) tag, or a read/write tag. As is known in the art, read only RFID tags contain unique information that cannot be changed. WORM tags may be encoded a single time and then locked into a read only state. Read/write RFID tags allow for unlimited updating and transfer of information to the tag. The RFID tag (13) may take the form of a thin flexible label or ticket that may be affixed to an object, such as a cup (11). Alternatively, as shown in FIG. 1, the RFID tag (13) may be embedded in a card or integrated into an object. The RFID tag (13) may also be molded directly into a cup (11).

The RFID tag (13) may also be an electronic article surveillance (EAS) tag. In general, the EAS tag would be attached to a disposable or non-disposable cup that will be filled at the liquid dispensing apparatus (85) only one time. Initially, the EAS tag will have a closed circuit/gate, rendering the tag active. When the EAS tag is placed over an EAS/RF antenna, the closed circuit is broken and the tag is deactivated. The EAS/RF antenna will indicate to the controller that an EAS tag has been deactivated and the controller will signal the dispensing heads to open until a predetermined number of ounces have been dispensed. The dispensing of a beverage occurs in a manner similar to that described below in connection with an RFID tag. Once the EAS tag's circuit is broken and the tag is deactivated, the tag cannot be reused. If a deactivated tag (broken circuit) is placed on the antenna again, it will not send a signal to the dispensing machine to make the dispensing heads active, since the antenna only sends a signal to activate the dispensing heads after an EAS tag's circuit is broken. In one embodiment the EAS tag can be reactivated by purchasing a refill. However, each reactivation only allows for a single transaction since each reading of the EAS tag by the antenna effectively deactivates the tag.

It should be recognized that the embodiments described are not meant to be limiting and the RFID tag (13) may include any read-only, read-write or a combination of read-only and read-write tags that are known in the art. For example, the RFID tag (13) could be any one of the programmable identification tags, EEPROMs, smart cards, magnetic strip cards, resonance circuits, or optical cards.

Figure 9:
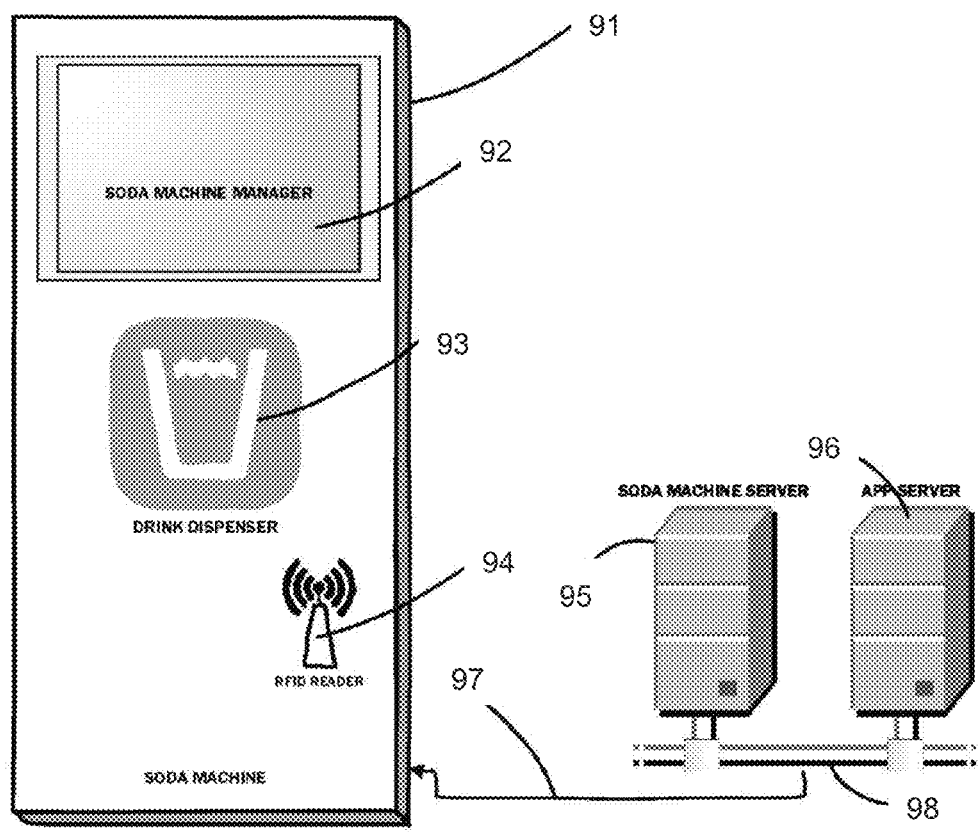
FIG. 9 is a beverage dispensing system connected to a network of computer systems.

As shown in FIG. 9, in some embodiments, the liquid dispensing apparatus (91) interfaces with a network of servers. The apparatus may have the same dispenser housing (93) and RFID reader (94) as before. In this case, the inventory manager (92) communicates via some type of local networking (97) such as Bluetooth interface with a soda machine server (95), which may be located at the establishment. The soda machine server communicates with an application server via an internet connection (98). In some embodiments, the inventory manager (92) may be the same machine as the soda machine server (95).

The beverage smart cup (11) helps to control the theft of beverages dispensed into containers not associated with the dispensing system (91) and/or not found in the inventory manager (92). The inventory manager records the exact amount of ounces and the customized drink selection being poured into each cup (e.g., based volumetric flow rate and time) to allow the customer to determine the average ounces poured per cup per program (e.g., for price validation), manage inventory, record keeping, record association with the cup's RFID tag (13) and determine where the cups were purchased. These and other features will help retailers bill offsite locations for beverages poured at their locations. For example, a remote network of servers (95, 96) may receive money for the sale of an RFID mug and associated refills, but the customer goes to a second retailer to dispense the refill. The inventory manager 82 allows the second retailer to bill the first retailer for the expense of the refill.

If a consumer creates a special mix of beverages to dispense into the same cup during a singe transaction, the record of such customized beverages being poured into the cup is recorded and communicated to the servers (95, 96). When a cup enters the reading field or the RFID antenna, the inventory manager (92) may be instructed to search for an RFID tag (13) after a cup is sensed by an IR sensor or when a button or lever is depressed. Each of these techniques assists the dispensing apparatus (91) in identifying where the cup (11) is located in the reading field. The RF Reader and antenna have the ability to locate a tag within approximately a 1 foot grid. However, readers (94) and antennas having a read field as small as inches from the antenna may be used.

In one embodiment, shown in FIG. 8, a package of refillable cups having an RFID tag is shipped and a store operator enter the package number (83) into the inventory manager (82) of dispensing system (85). Within the package number (83), holds the records of each individual cup's (11) RFID unique ID (13(. This eliminates the need by the store operator to enter each individual cup RFID as printed on each individual cup in the form of a QR code (12).

Figure 10:
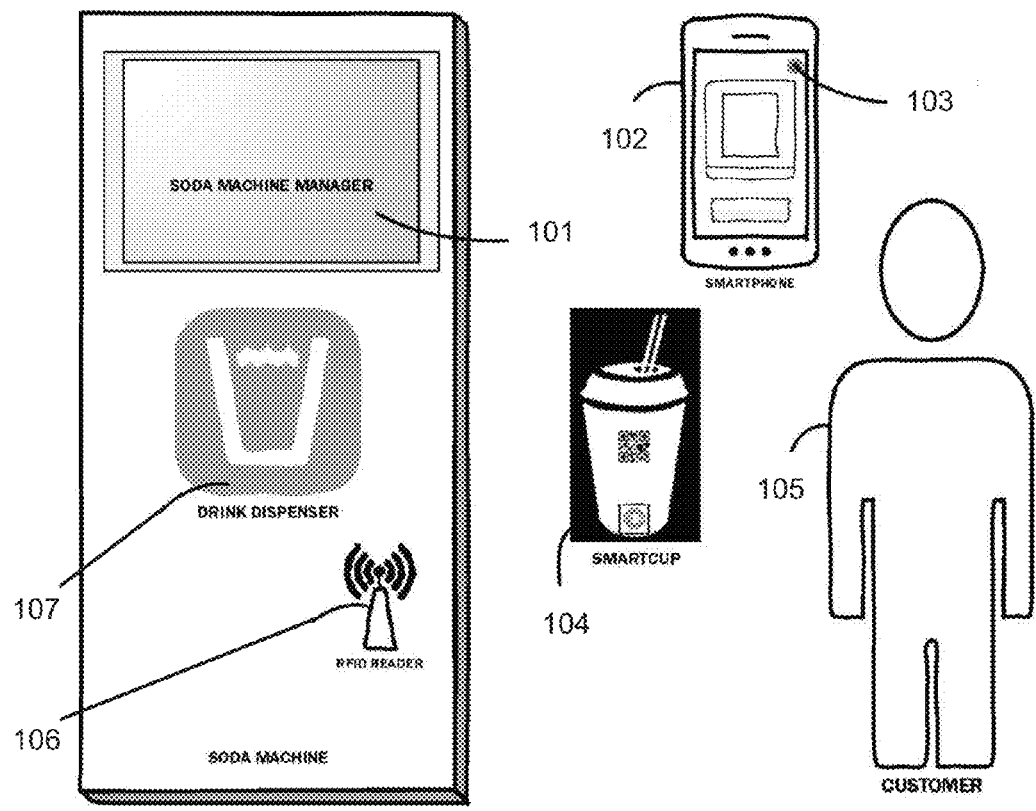
FIG. 10 is a beverage dispensing system, customer, Smart Beverage Cup, and smart mobile device.
Figure 11:
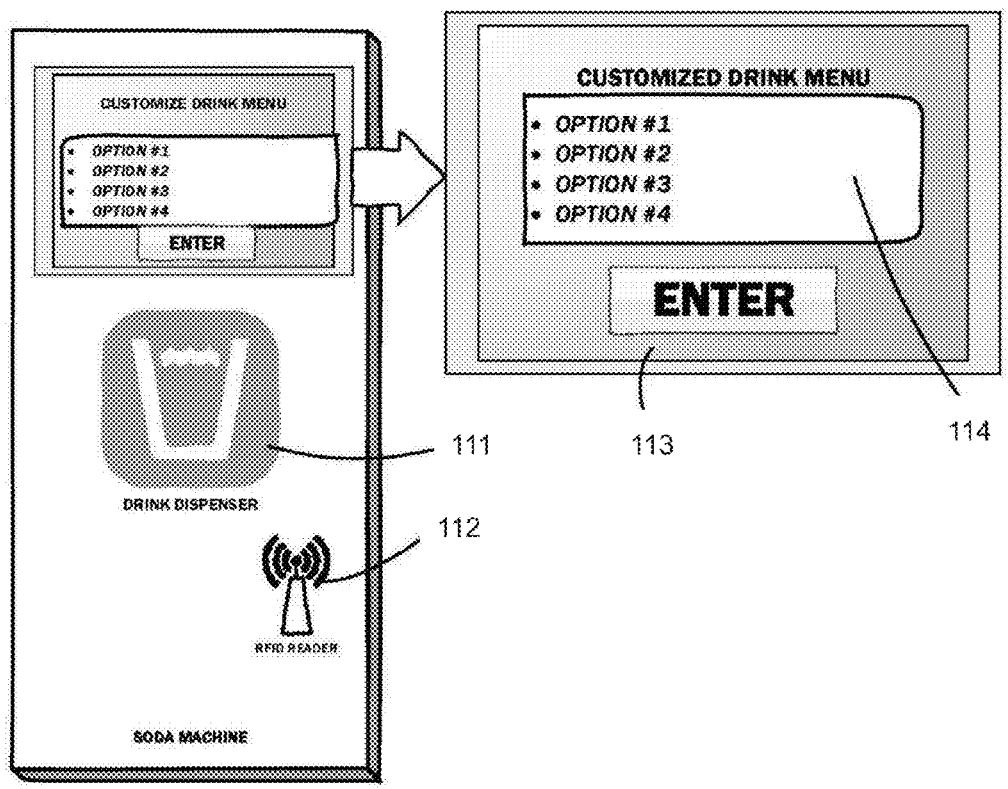
FIG. 11 is a beverage dispensing system equipped with a graphical user interface for consumers to create custom beverage entries.

In one embodiment, shown in FIGS. 10 and 11, a refillable cup (104) having an RFID tag is purchased at a cash register or other transaction area. When the customer (105) approaches the beverage dispensing apparatus, the cup is placed in the dispenser housing (107) and the position of the cup is located, e.g., by an infrared proximity sensor, a lever, or an on/off push button on the dispensing head. When a cup (104) is located, the read antenna (106, 112) will read the information on the cup's RFID tag (13). When the RFID tag (13) is read, the dispensing apparatus may prompt the inventory manager (101) to extract the pre-set ID from the RFID data. The collected information is used to verify the cups validity. If the cup is valid, a signal is sent from the inventory manager (101) to display the customized option drink menu (114) on the display screen (113). When a customized drink selection is made, a signal is sent from the inventory manager (101) to a dispensing head. The signal may be sent through a harness having a relay switch that is coupled to the dispensing head (107, 111). The valid signal will close the relay switch gate allowing the beverage to pour. Alternatively, the power to each head is turned on and off. When the power is on, the dispensing head will pour. When the power is off, the dispensing head will not pour. The head will stop pouring after the cup (104) is moved away from the proximity sensor, the pour lever is released, the on/off push button is released, or the allotted ounce capacity for the cup (104) has been reached. The inventory manager (101) stores the customized drink records, and shares the data with the servers (95, 96). The customer may then use his mobile phone (102) to scan the QR code on the smartcup (104), using the mobile phone camera (103), and view a record of the customized drink he or she purchased.

Figure 12:
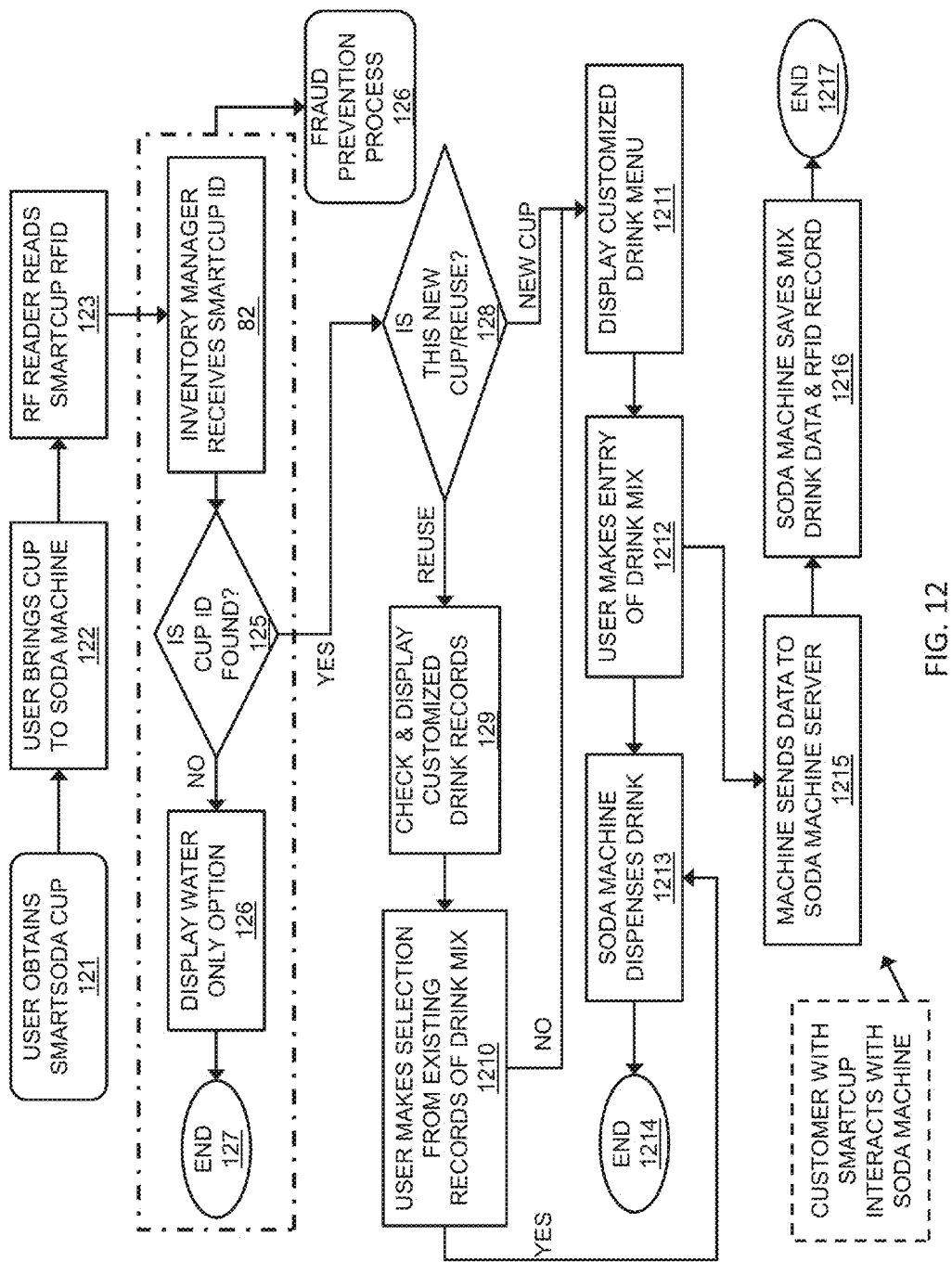
FIG. 12 is a process flow chart describing a customer with a Smart Beverage Cup interacting with a beverage dispensing system.

FIG. 12 illustrates one embodiment of the basic flow of a customer's interaction with the beverage dispensing apparatus (91). As indicated in block (121), when a customer obtains a smart beverage cup (104) and approaches the dispensing system (122) a proximity sensor identifies that a person or object has entered the vicinity of the apparatus (91) or within the vicinity of the drink dispenser (122). A signal is then read and sent from the RF Reader to the inventory manager (123) and inventory manager (124) performs a search for the smart beverage cup ID (125). If the smart beverage cup ID is not found, the dispensing system displays the water only option (126). If the smart beverage cup ID is found, the inventory manager performs the search for the cup ID to determine if this cup is new or reused (128). If the inventory manager determines that this smart cup is reused, the inventory manager checks and displays the existing records associated with the smart beverage cup (129). The inventory manager then displays the records for the customer to make a selection (1210). When a user selects an option from the existing mix drink records, the dispensing system dispenses the drink (1213). If the inventory manager determines that this smart beverage cup is new, the inventory manager displays a customized drink menu (1211). The user makes an entry of a drink mix (1212) and the dispensing machine dispenses the drink (1213). Once a user makes a new entry of a drink mix, the information is recorded and sent to the dispensing machine server (1215). The dispensing machine server saves the mixed drink data associated with the RFID record of the smart beverage cup (1216).

Figure 13:
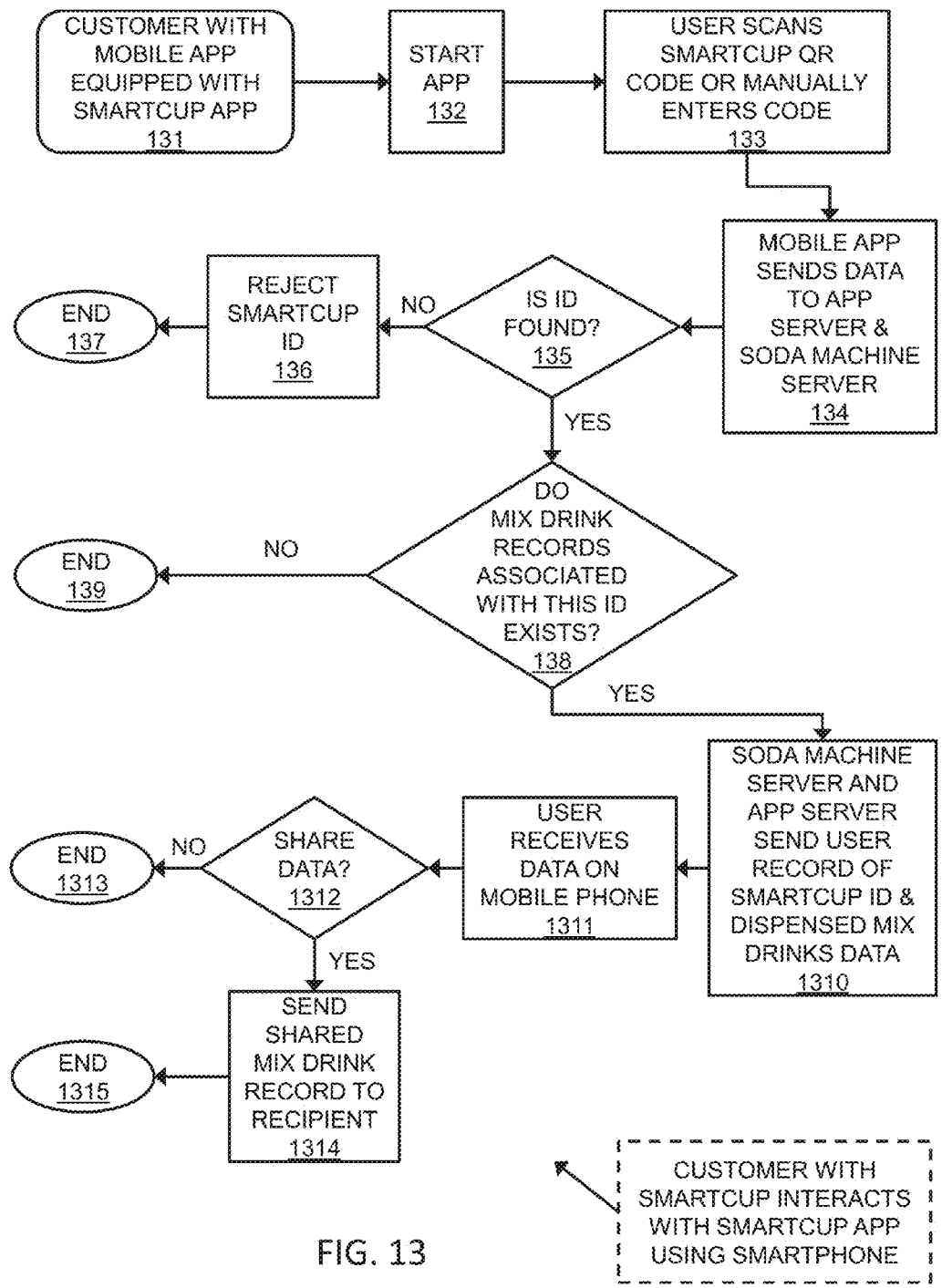
FIG. 13 is a process flow chart describing a customer interacting with a mobile application running on a smart mobile device.

FIG. 13 illustrates an embodiment of the basic flow of a customers interaction with a mobile application installed on a smart mobile device (102). A customer with a smart mobile device equipped with the smart beverage cup application (102) launches the app (132). The user is prompted to scan or enter a code associated with the smart beverage cup (133) either by scanning a QR code or by manual entry. Once the mobile application receives the data from the smart beverage cup (134), the data is shared with the network servers (95, 96). The servers (95, 96) determine if the records from the smart beverage cup ID are found (135). If it is not found, the smart beverage cup ID is rejected (136). If it is found, the server determines if there are records associated with the smart beverage cup ID (138). If the existing records associated with this smart beverage cup ID for the mixed drinks are found, the data is sent to the mobile application (1310). The mobile application displays the list of customized beverages on the mobile phone (1311). The user is then prompted to share the data with his peers (1312). If the user selects an option to share the data, a social media application interface is accessed (1314) in order to share the data via a selected social media application.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A smart liquid dispensing system (122) comprising:
   a. a plurality of containers (11), capable of holding liquids, having a radio frequency identification (RFID) tag (13) and a Quick Response (QR) code (12) disposed thereon, the RFID tag (13) configured to encode a unique pre-set ID,
   b. a liquid dispensing apparatus (85), adapted to communicate with an RFID tag, capable of dispensing at least one liquid, capable of selectively controlling which liquids may be dispensed, capable of detecting a customer approaching, and
   c. an inventory manager (82), operatively connected to the liquid dispensing system, configured to store a plurality of unique pre-set IDs corresponding to the containers (11), wherein when a customer holding the container (11) approaches the dispensing system (122), the liquid dispensing system activates a sensor that reads the RFID tag (13) on the container (11), whereupon the liquid dispensing apparatus sends the RFID tag data to the inventory manager (82), whereupon the inventory manager decodes the RFID data to extract the unique pre-set ID of the container, whereupon the inventory manager compares the pre-set ID to the plurality of pre-set IDs stored in memory, whereupon if there is a match for the pre-set ID (125), the inventory manager directs the liquid dispensing apparatus to dispense a liquid (1213);

wherein the liquid dispensing apparatus (85) comprises:
   a. a dispenser housing (146), wherein a size and shape of the housing is configured to accommodate a size and shape of the container,
   b. a host controller board (141),
   c. a display screen (142), operatively connected to the host controller board,
   d. a dispenser head (145), disposed above the dispenser housing (146),
   e. a dispenser head electronics (143), operatively connected to the host controller board (141), capable of operating at least one valve (144) to dispense a precise amount of liquid from a storage container (147),
   f. at least one valve (144) for dispensing liquids, operatively connected to the dispenser head electronics (143), the storage container (147), and to the dispenser head (145),
   g. at least one storage container (147) for storing a liquid to be dispensed, where each container is operatively connected to one valve (144), wherein when the value is opened, the liquid is dispensed from the storage container,
   h. an input/output board (148), operatively connected to the host controller board (141),
   i. an input device (149), operatively connected to the input/output board, capable of receiving a customer's input,
   j. a container detection mechanism (1410), operatively connected to the input/output board (148),
   k. a radio frequency identification reader board (1411), operatively connected to the input/output board (148),
   l. a radio frequency identification exciter antenna (1412), operatively connected to the RFID reader board (1411),
   m. a communications adapter (1413), operatively connected to the host controller board (141) and the inventory manager (82), wherein when customer places the container (11) in the dispenser housing (146), the container detection mechanism (1410) is activated, whereupon the input/output board (148) sends a signal to the host controller board (141), whereupon the host controller board directs the RFID reader board (1411) to excite the RFID antenna/exciter (1412), whereupon the RFID antenna excites the RFID tag (13) in the container (11), whereupon the RFID reader antenna (1412) receives a signal from the RFID tag (13) in the container, whereupon the RFID signal is decoded by the RFID reader board (1411), whereupon the RFID data is communicated to the host controller board (141), whereupon the host controller board sends the RFID data to the inventory manager (82) via the communications adapter (1413), whereupon the RFID tag of the container is verified by the inventory manager (82), whereupon the host controller (141) receives a verification indication from the inventory manager, whereupon the host controller (141) displays a list of options on the display screen (142), wherein the customer selects a liquid using the input device (149), wherein the selection is routed to the input/output board (148) and to the host controller board (141), whereupon the host controller board controls the dispenser head electronics (143) to activate an appropriate valve (144) to dispense a precise amount of the selected liquid, whereupon the liquid flows from the storage container (147) to the dispenser head (145) and is dispensed into the container (11), wherein when the container detection mechanism (1410) is deactivated, the host controller board (141) directs the dispenser head to close the valve (144), whereupon the dispenser head (145) stops pouring.

2. The system of claim 1, wherein the RFID tag data contains a serving size for the liquid to be dispensed, wherein the inventory manager directs the host controller to dispense a specified amount of liquid corresponding to the serving size, wherein if the allotted size has been reached, the host controller directs the dispenser head electronics to close the valve.

3. The system of claim 1, wherein the communications card may be an Ethernet card, Wi-Fi receiver, Bluetooth receiver, Firewire adapter, or other means for communicating between a computer systems.

4. The system of claim 1, wherein the container detection mechanism is a proximity sensor, lever actuator, or button.

5. The system of claim 1, wherein the input device is a keypad, a set of buttons aligned with items on the display screen, a touch screen, a joystick, a mouse, or other means of input as is known in the art.

6. The system of claim 1, where the dispensing apparatus further comprises an alignment device constructed to accommodate and align the container (11) relative to the dispenser head of the liquid dispensing apparatus.

7. The system of claim 1, wherein the liquid dispensing apparatus (85) further comprises a means for creating a customized beverage, wherein the host controller board is equipped to display a menu system for customizing a drink (1211) on the display screen, wherein the customer selects options from the menu system using the input device (1212), whereupon the host controller board receives the customized options from the input/output board, whereupon the host controller board determines precise amounts of a plurality of liquids to be dispensed for each customized drink, whereupon the host controller board controls the dispenser head electronics to create the customized drink by dispensing precise amounts of selected liquids into the container (1213), wherein the inventory manager stores the customized options and associates them with the pre-set ID of the container (1216).

8. The system of claim 7, wherein the system further comprises:
   a. a first soda machine server (95), operatively connected to the beverage dispensing apparatus (85), configured to store a plurality of pre-set IDs corresponding to the containers (11), configured to store a list of customized drink selections associated with each pre-set ID, and b. an application server (96), operatively connected to the soda machine server (95), configured to store a plurality of unique pre-set IDs corresponding to the containers (11), configured to store a list of customized drink selections associated with each pre-set ID, capable of communicating with a plurality of other soda machine servers (95) at other locations, wherein when the customer creates a customized drink on the liquid dispensing apparatus (85), the soda machine server stores the customized drink options (1215), and associates the customized drink with the RFID data of the container (1216), whereupon the soda machine server (95) shares the customized drink and unique pre-set ID with the application server (96), wherein when the customer approaches a second beverage dispensing apparatus (85) at a second location with the container (11), the inventory manager of the second beverage dispensing apparatus communicates the pre-set ID of the container (11) to the soda machine server (95), whereupon the soda machine server communicates the pre-set ID to the application server (96), whereupon the application server determines whether the cup is new or reused (128), whereupon if the cup is reused, the application server retrieves any customized beverage options stored on the application server (129), whereupon the customized drink options are communicated back to the second soda machine server and liquid dispensing apparatus (85), whereupon the customized drink options are displayed on the display screen as options within the menu system (129), whereupon the customer may select any previously created customized drink (1210) or create a new drink (1212), whereupon the host controller board receives the customized drink options from the inventory manager, whereupon host controller board controls the dispenser head electronics to create the customized drink by dispensing precise amounts of selected liquids into the container (1213).

9. The system of claim 8, wherein the selected liquids are dispensed into the container (11) in a specific order.

10. The system of claim 8, wherein the soda machine server (95) and inventory manager (82) are implemented on the same computer system.

11. The system of claim 8, wherein the RFID tag is encoded with a maximum number of uses for a container (11), wherein the number of uses is stored on the application server (96) and associated with the pre-set ID, wherein when the maximum number of uses for the container is exceeded, only a water only option is made available on the display screen (82) of the liquid dispensing apparatus (85).

12. The system of claim 8, wherein the RFID tag is encoded with information about a maximum amount of liquid that may be dispensed over multiple reuses of the container (11), wherein the amount of liquid dispensed thus far is stored on the application server (96) and associated with the pre-set ID, wherein the customer may use the container repeatedly until the amount of liquid dispensed reaches the maximum limit for the container (11), wherein on the last use, the dispenser head is controlled to precisely dispense the allowed amount of liquid remaining for the container (11).

13. The system of claim 8, wherein the application server is configured to transmit monetary charges between dispenser owning establishments, wherein the application server stores the vendor codes corresponding to various establishments, wherein when a customer makes a purchase at a first establishment, the RFID (13) of the container (11) is activated, wherein the vendor code of the first establishment is stored in the RFID tag data of the container (11), and wherein when the customer uses the container (11) to dispense a beverage at a second establishment, the vendor code is extracted from the RFID tag data by the soda machine server (95) at the second establishment, wherein the soda machine server (95) matches the vendor code against the vendor code at its establishment, and if the vendor code does not match, the soda machine server transmits a charge to the application server (96), wherein the charge includes the vendor code of the first establishment and the monetary amount, wherein the application server bills the first establishment for the purchase made at the second establishment.

14. The system of claim 8, wherein the system further comprises a mobile device application comprising:

a. a code for displaying an entry screen with a prompt button to scan a QR code, b. a code for scanning a QR code, using a camera operatively connected to the mobile device, c. a code for displaying a manual entry form for a container code, d. a code for receiving a QR code via manual entry by the user, e. a code for extracting data from the QR code related to the container, including a unique vendor code, liquid category code, container size, and unique pre-set ID, f. a code for storing the container QR code in memory, g. a code for transmitting a container's QR code to the application server via a wireless interface, h. a code for receiving a list of customized beverage options from the application server, i. a code for displaying a list of customized beverages, and j. a code for sharing one or more customized beverages using a social media application interface, wherein a customer using the mobile application (132) scans the QR code disposed upon the container (133), wherein the mobile application extracts the unique pre-set ID of the container from the QR code (12), whereupon the mobile application sends the pre-set ID to an application server and the soda machine server (134), whereupon the application server and soda machine server determine if the pre-set ID is found (135), wherein if the ID is not found the ID is rejected (136) and the application returns (137), wherein if the ID is found the application server and soda machine server search for customized drink selections associated with the ID (138), wherein if the app server and soda machine server find any customized drink selections associated with the pre-set ID, the application server (96) and soda machine server (95) return the list of customized drinks to the mobile application (1310), whereupon the list of customized drinks is displayed to the customer (1311), wherein the customer may share the customized drinks on a social media application (1312).

15. The system of claim 14, wherein the customer may add, edit, or delete customized beverage options, whereupon the modified data is updated in the application server (96), whereupon the modified customizations are retrieved from the application server and made available on the display screen (82) the next time the customer approaches a beverage dispensing apparatus with the container (11).

* * * * *